US009620111B1

(12) United States Patent  
Bell et al.

(10) Patent No.: US 9,620,111 B1  
(45) Date of Patent: Apr. 11, 2017

(54) GENERATION AND MAINTENANCE OF LANGUAGE MODEL

(75) Inventors: Matthew P. Bell, Sunol, CA (US); Stephen Polansky, Santa Clara, CA (US); Yuzo Watanabe, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 213 days.

(21) Appl. No.: 13/461,471

(22) Filed: May 1, 2012

(51) Int. Cl.
*G10L 15/00* (2013.01)
*G10L 15/183* (2013.01)
*G10L 15/18* (2013.01)

(52) U.S. Cl.
CPC ............ *G10L 15/183* (2013.01); *G10L 15/18* (2013.01)

(58) Field of Classification Search
CPC ...................................................... G10L 15/183
USPC .................................................. 704/231, 251
See application file for complete search history.

(56) References Cited

U.S. PATENT DOCUMENTS

| | | | | |
|---|---|---|---|---|
| 6,178,401 B1 * | 1/2001 | Franz et al. | | 704/255 |
| 6,188,976 B1 * | 2/2001 | Ramaswamy et al. | | 704/9 |
| 6,484,136 B1 * | 11/2002 | Kanevsky et al. | | 704/9 |
| 6,501,833 B2 * | 12/2002 | Phillips et al. | | 379/88.07 |
| 7,031,925 B1 * | 4/2006 | Goldberg | | G10L 15/26 704/231 |
| 7,310,601 B2 * | 12/2007 | Nishizaki et al. | | 704/240 |
| 7,415,409 B2 * | 8/2008 | Simoneau et al. | | 704/243 |
| 7,426,479 B2 * | 9/2008 | Otto | | 705/7.29 |
| 8,005,680 B2 * | 8/2011 | Kommer | | 704/275 |
| 8,041,566 B2 * | 10/2011 | Peters et al. | | 704/236 |
| 8,266,014 B1 * | 9/2012 | Bhosle et al. | | 705/26.7 |
| 8,332,218 B2 * | 12/2012 | Cross et al. | | 704/231 |
| 8,473,296 B2 * | 6/2013 | Grobauer et al. | | 704/257 |
| 2002/0087309 A1 * | 7/2002 | Lee et al. | | 704/240 |
| 2002/0087311 A1 * | 7/2002 | Leung Lee et al. | | 704/251 |
| 2002/0087315 A1 * | 7/2002 | Lee et al. | | 704/256 |
| 2002/0095292 A1 * | 7/2002 | Mittal et al. | | 704/270 |
| 2002/0107918 A1 * | 8/2002 | Shaffer | | G06Q 10/08 709/203 |
| 2005/0055210 A1 * | 3/2005 | Venkataraman et al. | | 704/255 |
| 2005/0182628 A1 * | 8/2005 | Choi | | 704/252 |
| 2005/0288935 A1 * | 12/2005 | Lee et al. | | 704/270 |
| 2010/0191520 A1 * | 7/2010 | Gruhn | | G06F 3/0237 704/9 |
| 2010/0217604 A1 * | 8/2010 | Baldwin et al. | | 704/275 |
| 2011/0161077 A1 * | 6/2011 | Bielby | | 704/231 |
| 2011/0231310 A1 * | 9/2011 | Roberts | | G06F 21/316 705/40 |
| 2011/0296374 A1 * | 12/2011 | Wu | | G06F 17/2715 717/104 |

* cited by examiner

*Primary Examiner* — Shaun Roberts

(74) *Attorney, Agent, or Firm* — Eversheds Sutherland (US) LLP

(57) ABSTRACT

Described herein are systems and methods for the generation and maintenance of language models. Language models are developed based at least in part on transaction data from one or more users. These transactions may include purchases and other interactions between one or more users and one or more online merchants. The language models may be associated with a particular user or group of users. Ongoing transactions may modify the language models. The language models may be used to recognize spoken input from the one or more users.

24 Claims, 11 Drawing Sheets

GENERATION AND MAINTENANCE OF LANGUAGE MODEL

BACKGROUND

Speech provides a convenient way to exchange information. As the prevalence of technology continues to increase, developers of devices desire ways to improve human communication with devices. One avenue is to enable devices to recognize speech, allowing a more natural and convenient way to receive input from users. Speech recognition may involve the use of language models to interpret speech into commands, text, and so forth.

DETAILED DESCRIPTION

Automated speech recognition allows devices to accept spoken input from a user. Speech recognition may use one or more language models which associate one or more phonemes with letters, numbers, words, phrases, and so forth. Language models may vary in size from small models configured to recognize "yes" or "no" to larger models incorporating thousands of words or more.

Entities such as businesses, governments, and other organizations may use automated speech recognition to receive data from users. For example, businesses such as merchants may use speech recognition to take orders from customers, accept customer reviews of goods or services, and so forth.

This disclosure describes systems and methods associated with building and maintaining language models based at least in part on transactions. These transactions may be interactions between users and the entity or devices operated by the entity. For example, placing an order with an online merchant generates transactions including, but not limited to, searching for a good or service of interest, providing information about the good or service of interest, receiving an order, receiving payment and shipping parameters, and so forth. Transaction data based on these transactions may be used to determine language model elements such as particular words or phrases which are incorporated into, or removed from, a language model. The language model may be associated with a particular user, or a group of users. As data is accumulated, the language model becomes tuned to include words or phrases of interest, thus improving accuracy of speech recognition using the model. For example, as the user purchases particular goods or services, a language model associated with that user becomes more accurate with respect to recognizing speech from the user and incorporates terms related to the purchases.

Illustrative System

Figure 1:
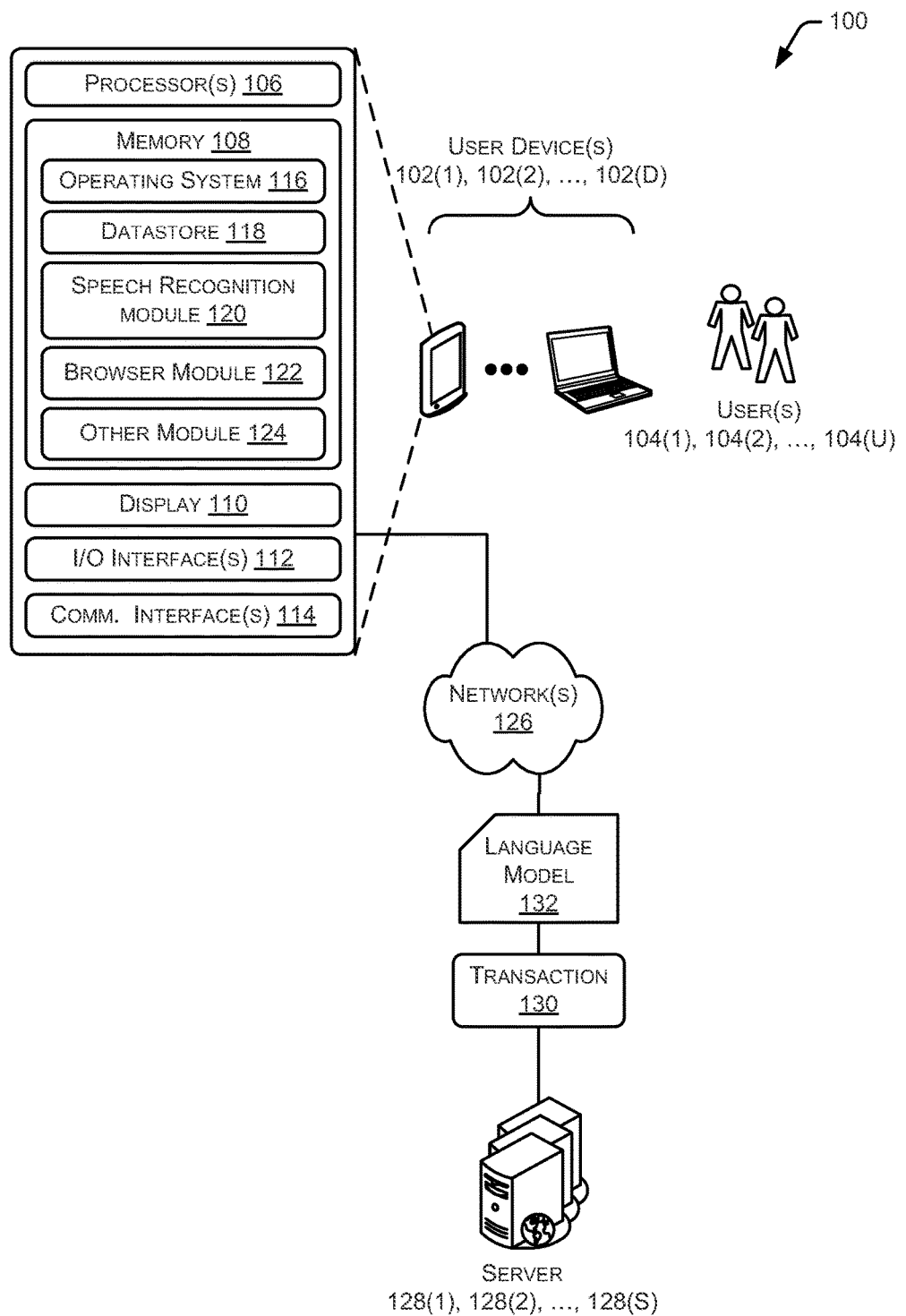
FIG. 1 illustrates a system for generating or maintaining a language model in accordance with an embodiment of the disclosure.

FIG. 1 illustrates a system 100 for generating or maintaining a language model. One or more user devices 102(1), 102(2), . . . 102(D) may be used by one or more users 104(1), 104(2), . . . 104(U). As used herein, letters enclosed by parenthesis such as "(D)" or "(U)" indicate an integer having a value greater than zero. The user devices 102 may include smartphones, laptop computers, desktop computers, tablet computers, televisions, set-top boxes, game consoles, in-vehicle computer systems, and so forth. The user devices 102 comprise one or more processors 106, one or more memories 108, one or more displays 110, one or more input/output ("I/O") interfaces 112, and one or more communication interfaces 114.

The processor 106 may comprise one or more cores and is configured to access and execute at least in part instructions stored in the one or more memories 108. The one or more memories 108 comprise one or more computer-readable storage media ("CRSM"). The one or more memories 108 may include, but are not limited to, random access memory ("RAM"), flash RAM, magnetic media, optical media, and so forth. The one or more memories 108 may be volatile in that information is retained while providing power or non-volatile in that information is retained without providing power.

The display 110 is configured to present visual information to the user 104. The display 110 may comprise a reflective or emissive display configured to present images. An emissive display emits light to form an image. Emissive displays include, but are not limited to, backlit liquid crystal displays, plasma displays, cathode ray tubes, light emitting diodes, image projectors, and so forth. Reflective displays use incident light to form an image. This incident light may be provided by the sun, general illumination in the room, a reading light, and so forth. Reflective displays include, but are not limited to, electrophoretic displays, interferometric displays, cholesteric displays, and so forth. The display 110 may be configured to present images in monochrome, color, or both. In some implementations, the display 110 of the user device 102 may use emissive, reflective, or combination displays with emissive and reflective elements.

The one or more I/O interfaces 112 may also be provided in the user device 102. These I/O interfaces 112 allow for coupling devices such as microphones, speakers, headsets, keyboards, joysticks, touch sensors, cameras, haptic output devices, external memories, and so forth to the user device 102.

The one or more communication interfaces 114 provide for the transfer of data between the user device 102 and another device directly such as in a peer-to-peer fashion, via a network, or both. The communication interfaces 114 may include, but are not limited to, personal area networks ("PANs"), wired local area networks ("LANs"), wireless local area networks ("WLANs"), wireless wide area networks ("WWANs"), and so forth. The communication interfaces 114 may utilize acoustic, radio frequency, optical, or other signals to exchange data between the user device 102 and another device such as an access point, a host computer, a router, another user device 102, and the like.

The one or more memories 108 may store code or program instructions for execution by the processor 106 to perform certain actions or functions. These instructions may include an operating system 116 configured to manage hardware resources such as the I/O interfaces 112 and provide various services to applications executing on the processor 106. The one or more memories 108 may also store a datastore 118 containing information about the operating system, language models, configuration files, and so forth.

A speech recognition module 120 is stored in the one or more memories 108. The speech recognition module 120 is configured to accept audio containing human speech from a microphone, such as coupled to the I/O interface 112, and generate output based at least in part on this speech. In some implementations, all or a portion of the speech recognition module 120 or functionality associated therewith may be provided by another device accessed via the I/O interfaces 112 or the communication interfaces 114. The speech recognition module 120 is configured to use one or more language models containing language model elements to recognize the text. These language models provide an association between a phoneme or other sound element conveying meaning in a spoken language. The speech recognition module 120 may use language models generated or modified as described below. In some implementations the speech recognition module 120 may be present on the server 128 instead of, or in addition to, in the memory 108 of the user device 102.

A browser module 122 may be stored in the one or more memories 108 and configured to access information, such as hyper-text markup language ("HTML") or other pages or documents. The browser module 122 may be configured to retrieve the information from one or more of the memories 108, or from another device such as via the I/O interfaces 112 or the communication interfaces 114.

The one or more memories may store other modules 124 configured to provide various functions. These one or more other modules 124 may provide for speech synthesis, presentation of electronic books ("e-Books"), audio, video, other media, and so forth. For example, the other modules 124 may include an electronic book reader, a music player, or a video player.

The user device 102 may use the communication interface 114 to send and receive information via the network 126 to one or more servers 128(1), 128(2), . . . , 128(S). The network 126 may comprise one or more private networks, public networks such as the Internet, or a combination of both configured to transfer data between two or more devices.

The server 128 may comprise individual servers, groups of servers, cloud resources providing messaging functionality, or a combination thereof. The servers 128 may be configured to provide various functionality such as participating in one or more transactions 130 with the users 104, generating or modifying one or more language models 132, and so forth. The speech recognition module 120 may receive at least a portion of the language model 132 and utilize the language model 132 to recognize speech. As described below, the language model 132 and language model elements therein may be based at least in part on the one or more transactions 130.

The servers 128, or a portion thereof, may be operated as an online merchant, accepting orders via the network 126, via a telephone call, via voice-over-Internet protocol ("VOIP"), via short message service ("SMS"), and so forth for the acquisition or transfer of goods or services. The server 128 is described in more detail below with regard to FIG. 2.

While various functions are described herein with respect to particular modules or devices, it is understood that these functions may be distributed in many ways across the modules, devices, or both. In one implementation, the speech recognition module 120, the browser module 122, or the other modules 124 may be executed in whole or in part or otherwise supported by one or more of the servers 128 as accessed via the network 126 or the user devices 102. In another implementation, at least a portion of the speech may be received by the user device 102 and provided to the server 128 for speech recognition.

Figure 2:
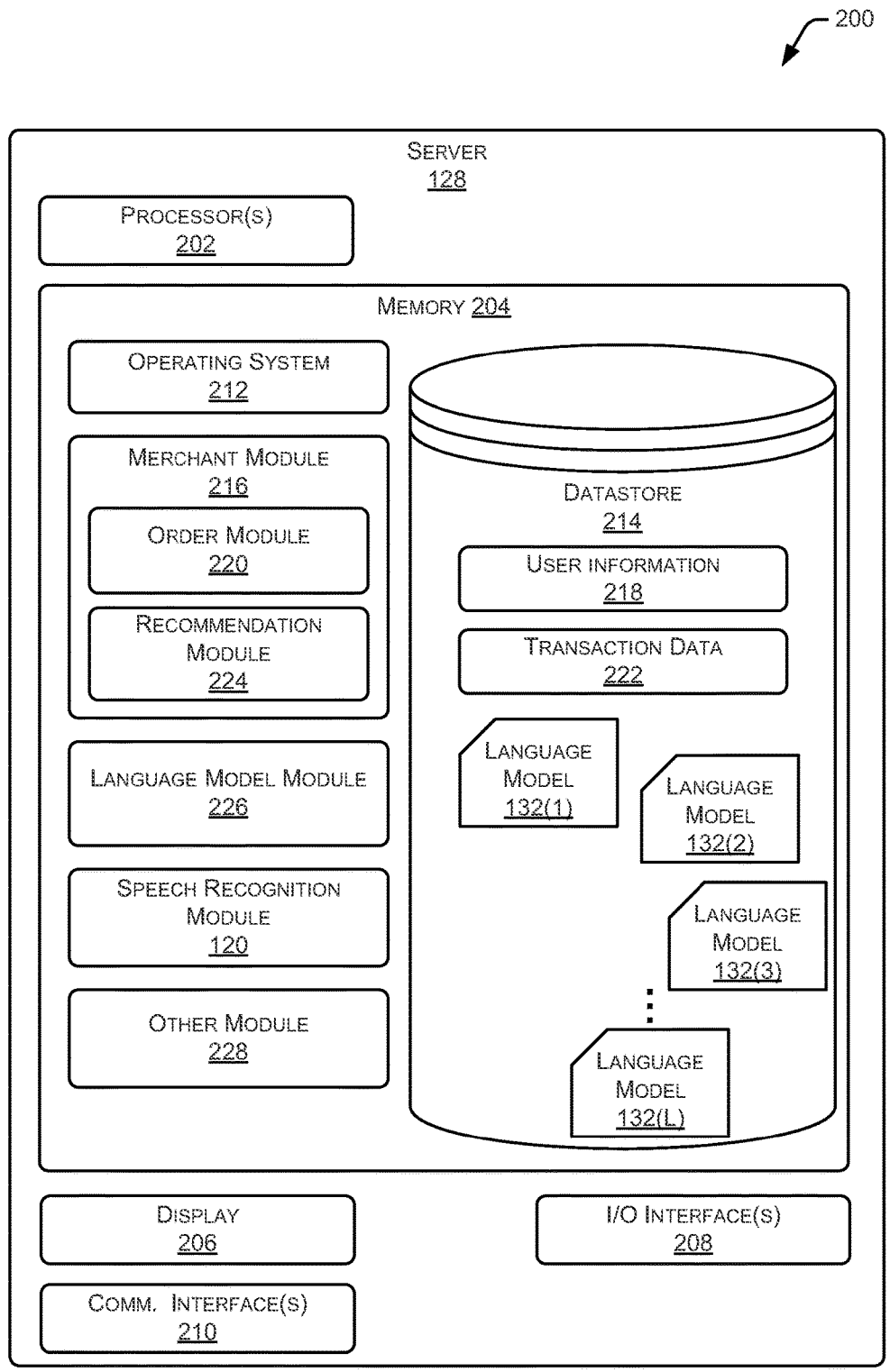
FIG. 2 illustrates a block diagram of a server configured to generate or maintain the language model in accordance with an embodiment of the disclosure.

FIG. 2 illustrates a block diagram 200 of the server 128 configured to generate or maintain the language model.

The one or more memories 204 may store code or program instructions for execution by the processor 202 to perform certain actions or functions. These instructions may include an operating system 212 configured to manage hardware resources such as the I/O interfaces 208 and provide various services to applications executing on the processor 202. A datastore 214 may also be in the one or more memories 204 and may contain information about the operating system 212, configuration files, and the information described below.

A merchant module 216 stored in the one or more memories 204 is configured to participate in transactions involving the users 104. User information 218 may be stored in the datastore 214. This user information 218 may include user logon credentials, payment information, demographic information, shipping addresses, billing addresses, preferences, configuration settings, and so forth.

The merchant module 216 may provide an order module 220 or other module configured to participate in a transaction or interaction with the user 104. The order module 220 may be configured to accept transaction requests, or initiate transaction requests. For example, the order module 220 may be configured to respond to queries for goods or services available for acquisition. This interaction, such as the query for goods or services, is a transaction. Transaction data 222 associated with the transaction may be stored in the datastore 214. Continuing the example, the transaction data 222 may comprise details about the identity of the user 104 making the query, the terms used in the query, and at least a portion of the results in responding to the query. Transactions and the transaction data 222 are discussed below with regard to FIG. 3.

A recommendation module 224 may be configured to access at least a portion of the transaction data 222, the user information 218, or a combination thereof to generate suggestions for goods, services, promotional messages, and so forth which may be deemed relevant or of interest to the user 104. The recommendations may be associated with a particular user 104, or with a group of users 104. For example, when the user 104(1) purchases a laptop computer using the order module 220, recommendations for the purchase of laptop accessories may be made to the user 104(1).

A language model module 226 is configured to generate language models 132, modify language models 132, or provide both generation and modification. The language model module 226 is configured to generate or modify one or more language models 132 based at least in part on the transaction data 222, the user information 218, or a combination thereof. For example, based on the transaction data 222 describing the purchase of a laptop by the user 104(1), a language model 132(1) may be generated which contains language model elements such as words associated with laptop accessories. As a result, the user 104(1) may engage in additional transactions associated with the laptop purchase using voice input which is more reliable due to the language model 132(1), such as ordering an additional battery, signing up for an online data backup service, and so forth. In comparison, another user 104(2) who has only purchased a pet leash would have an associated language model 132(2) which omits language model elements associated with laptop accessories, and instead may contain language model elements relating to pet supplies, veterinary services, and so forth.

In some implementations, the language model module 226 may be stored at least in part in the memory 108 of the user device 102. The language model module 226 or functionality associated therewith may also be distributed across a plurality of devices such as the user device 102, the server 128, and so forth.

These language models 132(1), 132(2), 132(3), . . . , 132(L) may be stored at least in part in the datastore 214. In some implementations, the language models 132 or a portion thereof may be provided to the user device 102 for storage in the one or more memories 108. The language models 132 are discussed below in more detail with regard to FIG. 4.

The server 128 or another device accessible to the user device 102 via the network 126 may also have stored in memory a speech recognition module 120. The speech recognition module 120 may be configured to access one or more of the language modules 132(1)-(L) to recognize speech. For example, in some implementations the user device 102 may transfer at least a portion of speech or data representative thereof to the server 128 for processing by the speech recognition module 120. The speech recognition module 120 may then access the language module 132, such as associated with a particular user 104, and recognize the speech.

Other modules 228 may also be stored in the memory 204. For example, a speech synthesis module may be configured to provide synthesized human speech such that the user 104 may receive verbal information from the server 128.

Figure 3:
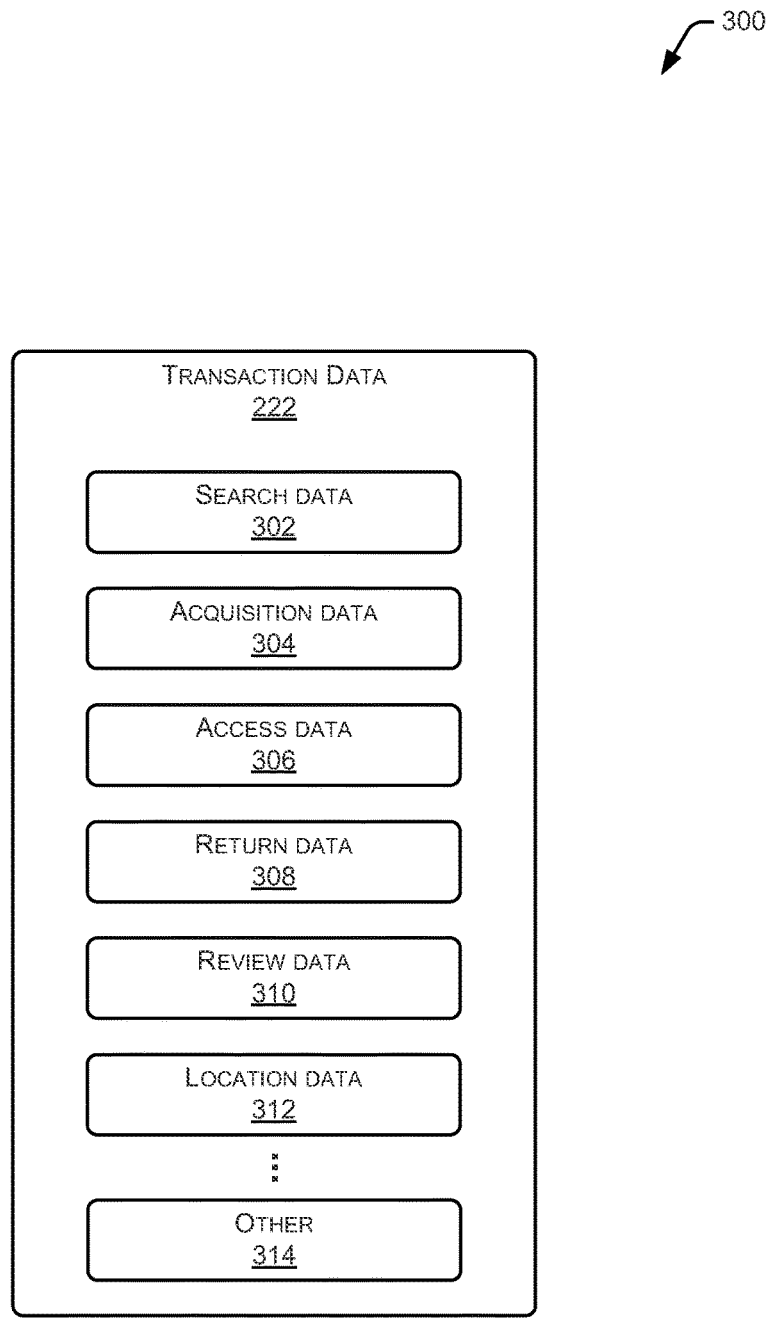
FIG. 3 illustrates a block diagram of transaction data which may be used at least in part to generate or modify a language model in accordance with an embodiment of the disclosure.

FIG. 3 illustrates a block diagram 300 of the transaction data 222 which may be used at least in part to generate or modify a language model 132. Transactions 130 comprise interactions with the server 128. These interactions may result from an action of the user 104, from a process executing on the user device 102 or another device, or a combination thereof. For example, the transaction 130 may comprise the user 104 using the user device 102 to select a good or service for purchase. In another example, the transaction 130 may comprise a previously configured process such as an automatically recurring purchase of a good or service which executes on the user device 102 or the server 128. The transaction 130 may generate one or more pieces of transaction data 222. The transaction data 222 may be associated with a particular user 104, a group of users 104, or a combination thereof.

Search data 302 may be generated when the transaction 130 involves a query for information. The search data 302 may comprise search terms, operators, results from the search, frequency of the search, and so forth. For example, the search data 302 may comprise the user's entry of the terms "laptop computer" into a search dialog box on a website of an online merchant.

Acquisition data 304 indicates transactions which involve a purchase, a lease, a license, and so forth. For example, acquisition data 304 may indicate the user 104(1) has purchased a particular make and model of laptop computer on a particular date.

Access data 306 indicates transactions where data such as digital content is transferred to or from the server 128 or another device. For example, the access data 306 may provide information about the user 104 streaming and playing on the user device 102 a media file such as music which is stored on the server 128. In another example, the access data 306 may describe files which the user has transferred to the server 128.

Return data 308 indicates the return of goods or rescission of agreements for services. The return data 308 may describe the conditions of the return or rescission, the amount of a refund if any, and so forth. For example, the return data 308 may indicate that the user 104(1) received a refund after returning the particular laptop to the merchant because it was the wrong color.

The transaction data 222 may include review data 310 or other comments which are associated with a good or service. The review data 310 may include feedback from the users 104 about the suitability, performance, quality, and so forth of a good, service, brand, and so forth. For example, the review data 310 may comprise a review of the purchased laptop as posted by the user 104(1). In some implementations, the review data 310 may comprise one or more of text, ranking, or audio.

Location data 312 may comprise data about relative locations (such as in the user's 104 office, in the break room) or geographic locations (such as latitude and longitude) of one or more participants in the transaction 130. For example, the geographic location (or "geolocation") of the user 104 at the time of placing the order may be included in the transaction data. In another implementation, the location data 312 associated with the server 128, or an entity other than or in addition to the user 104, may be stored. Continuing the example, location data 312 may describe a geolocation where the user 104 may pick up and accept delivery of the laptop.

Other data 314 about the transaction 130 may be stored in the transaction data 222; for example, the communication network used, the user device 102 used, the browser used, and so forth.

Figure 4:
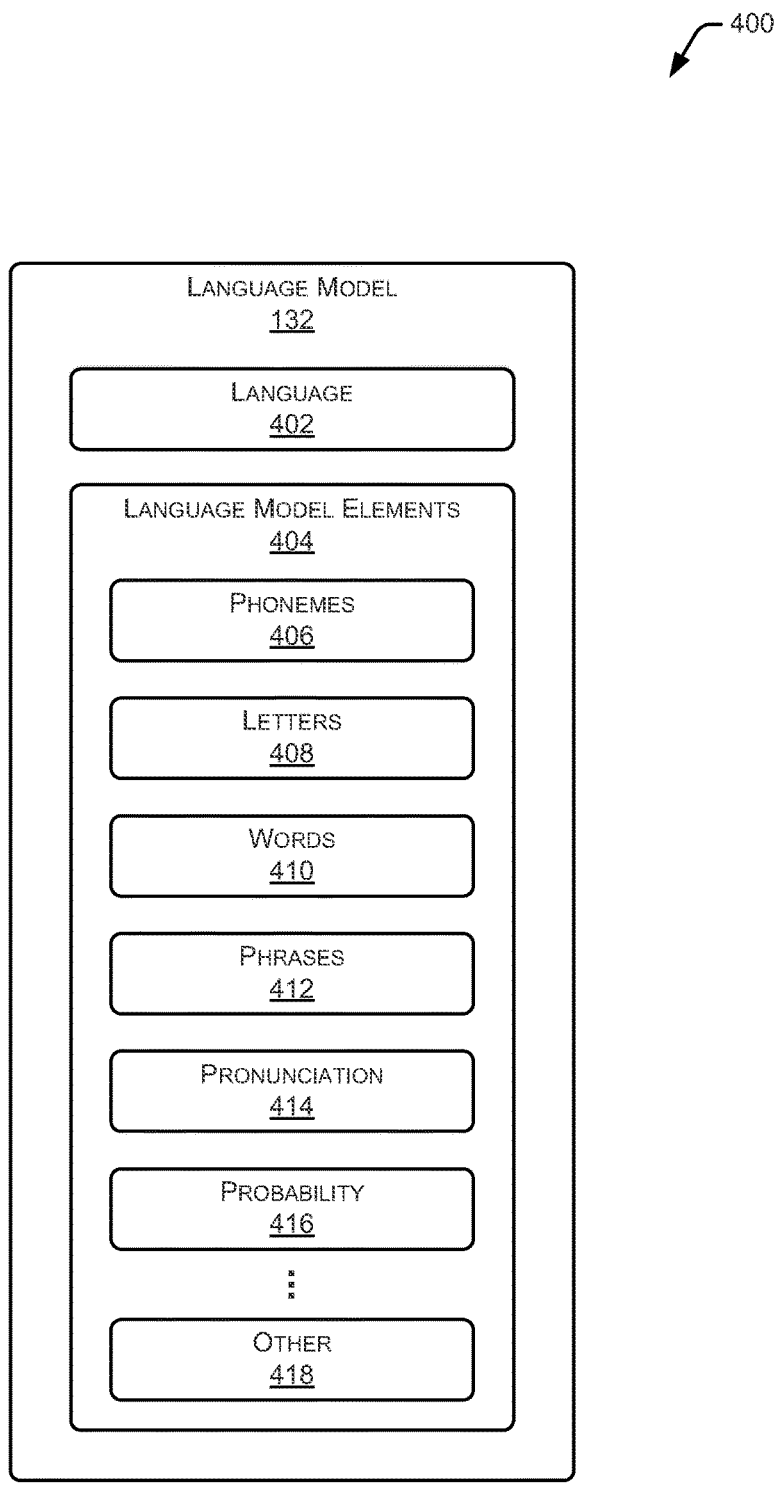
FIG. 4 illustrates a block diagram of a language model in accordance with an embodiment of the disclosure.

FIG. 4 illustrates a block diagram 400 of the language model 132. The speech recognition module 120 accesses the language model 132 and uses the data therein to recognize the speech. In some implementations, a statistical language model may be used, such as a unigram or n-gram arrangement. Other language models may be used, such as a positional language model, a factored language model, and so forth. The language model is configured to accept speech sounds and generate output. This output may be one or more of text, commands, and so forth.

The language model 132 may be associated with and used for a particular language 402. For example, the language model for English would differ from the language model for Russian. In some implementations, different language models 132 may be maintained for different languages.

The language model 132 comprises one or more language model elements 404. These language model elements 404 may include phonemes 406, or associations to phonemes. Phonemes are a sound element conveying meaning in a spoken language. The phonemes 406 for one or more different languages, or references to those phonemes, may be stored in the language 402. In other implementations, other sound elements or divisions of audible speech may be used.

The language model elements 404 may include one or more of letters 408, words 410, or phrases 412 which are associated with particular phonemes 406 or groups of phonemes 406. Pronunciations 414 may also be included in the language model elements 404. The letters 408, words 410, phrases 412, pronunciations 414 or combinations thereof may have associated probabilities 416 indicating the likelihood of their occurrence in speech.

The language model elements 404 may also include other 418 data or relationships as well; for example, positional information as to the relative position of one word or phrase in relation to another may be maintained, or the elapsed time since added to the language model 132, and so forth.

Figure 5:
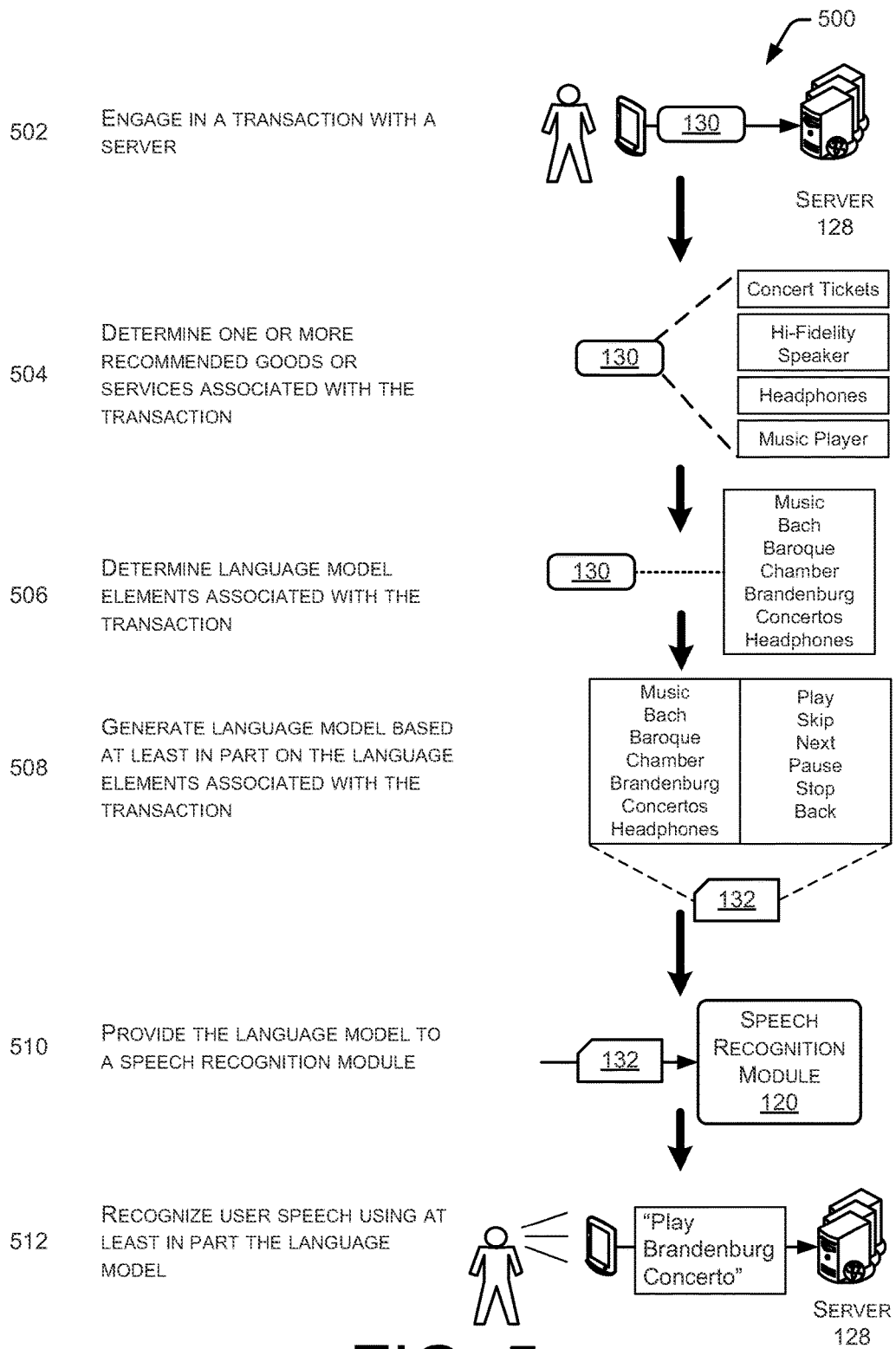
FIG. 5 illustrates a scenario of generating a language model based at least in part on a transaction in accordance with an embodiment of the disclosure.

FIG. 5 illustrates a scenario 500 of generating a language model 132 based at least in part on a transaction. In this scenario, at 502 a user may engage in a transaction 130 with a server 128. As shown here, the transaction 130 may comprise the user 104 using the user device 102 to purchase a license to a collection of classical music composed by Bach.

At 504, one or more recommended goods or services associated with the transaction 130 are determined. For example, the recommendation module 224 may determine that concert tickets, hi-fidelity speakers, headphones, and music players are associated with the purchase of Bach.

At 506 language model elements 404 associated with the transaction 130 are determined. For example, the language model elements 404 including words 410 and phrases 412 such as "Music," "Bach," "Baroque," "Chamber," "Brandenburg," "Concertos," and the titles of music tracks present in the purchased collection may be determined. The association may be determined based at least in part upon information derived from detail pages, metadata, and other information stored on or accessible to the server 128 which is related to the marketing, offering, support, operation, and so forth of the good or service. Some language model elements 404 or groups of language model elements 404 may be pre-defined, such as a set of command words or phrases associated with controlling selection and playback of music. For example, the command words may include "play," "skip," "next," "pause," "stop," "back," and so forth.

The language model elements 404 associated with the transaction 130 may also include the recommended goods or services. For example, as shown here, words associated with the recommended goods or services may be included such as "headphones."

At 508, a language model 132 is generated based at least in part on the elements associated with the transaction 130. For example, the language model module 226 may be configured to incorporate the language model elements 404 described above which are associated with the transaction 130. This language model 132 is thus specifically configured to include terms which are presumed to be of interest to the user 104, based at least in part on the purchase. As a result, the language model 132 is focused to the user 104 or users 104 with similar usage profiles. Therefore, terms that the user 104 may not use frequently, if at all, are omitted from the language model 132.

At 510, the language model 132 is provided or otherwise made accessible to the speech recognition module 120 on the user device 102, the server 128, or both. The language model 132 may be provided via the network 126, physical transfer of CRSM, and so forth. The language model 132 may be accessible to the user device 102 or to another process operating in conjunction with the user device 132. For example, in some implementations the user device 102 may send speech to the server 128 for processing by the speech recognition module 120 thereon. The speech recognition module 120 of the server 128 may then access the language model 132 associated with the user device 102, the user 104, and so forth.

In some implementations, a representation of the language model 132 may be provided. For example, a set of instructions may indicate what language model elements 404 may be provided to the user device 102 or another device. These instructions may then be used to generate the language model 132.

At 512, the speech recognition module 120 recognizes user speech using at least in part the language model. Because the language model 132 is tuned to the letters 408, the words 410, the phrases 412, and so forth associated with the use by the user 104, performance of the speech recognition module 120 may be improved. For example, the user speaking "Play Brandenburg Concerto" would be interpreted correctly, compared to a non-transaction based language model which may interpret the phrase as "Play Branden Berg Con Share Toe."

Figure 6:
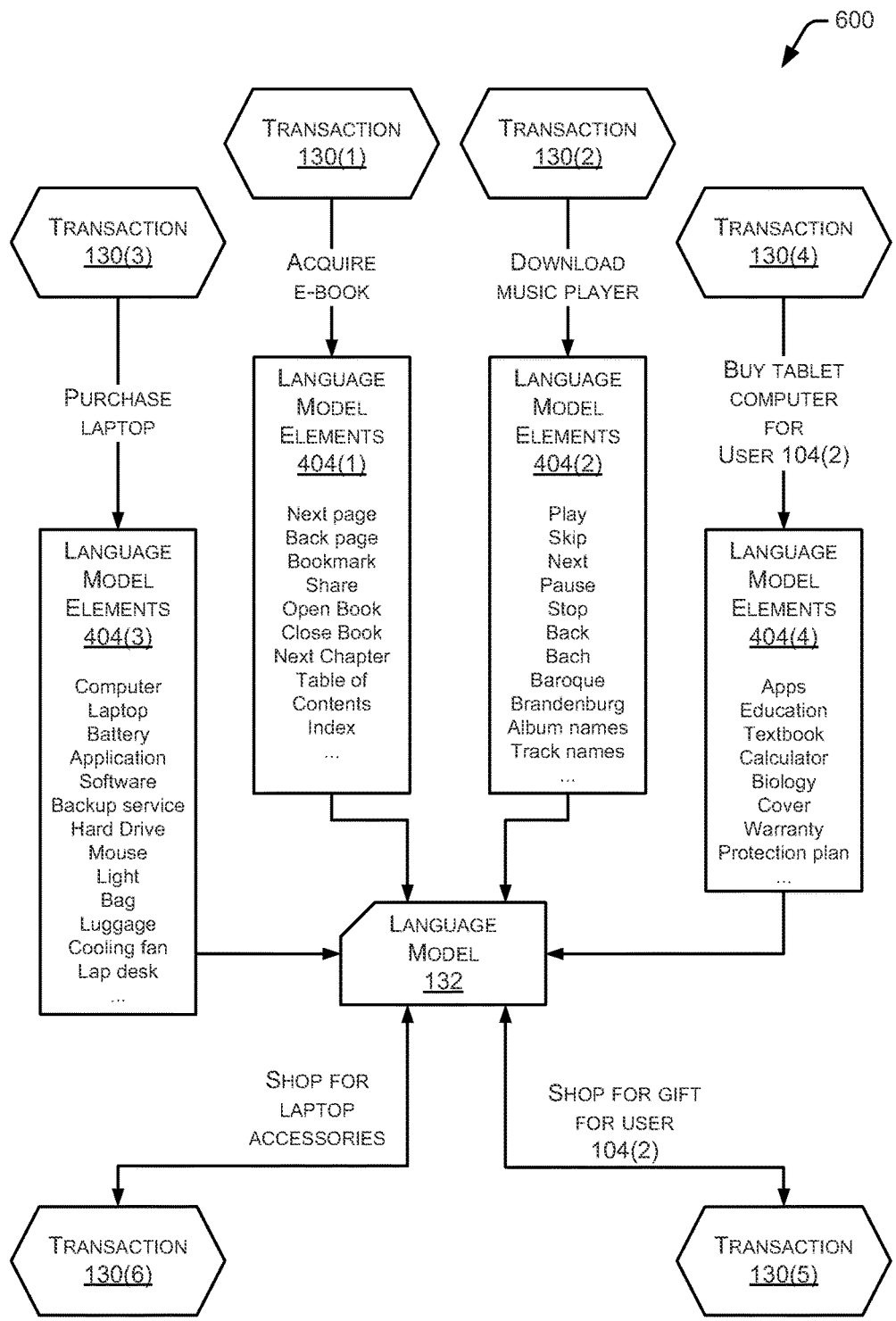
FIG. 6 illustrates several transactions resulting in updates to the language model in accordance with an embodiment of the disclosure.

FIG. 6 illustrates several transactions 600 resulting in updates to the language model 132. Transaction data 222 for one or more transactions 130 may be used to generate or modify the language model 132. For example, the language model 132 may start with no language model elements therein and, as transactions occur, be appended with at least a portion of the language model elements associated with the transactions. The language model 132 may be associated with a particular user 104, or a group of users 104, such as those with similar transactional data 222, demographics, and so forth.

Transaction 130(1) involves the user 104(1) acquiring a license to an e-Book. For example, the user 104(1) may acquire rights to text of the play "Hamlet" by William Shakespeare of which at least a portion is presented on the user device 102. The language model module 226 may associate one or more language model elements 404(1) with this transaction 130(1); for example, reading commands such as "next page" or the names of characters appearing in Hamlet such as "Polonius." As least partly as a result of the transaction 130(1), these language model elements 404(1) are incorporated at least in part into the language model 132 associated with the user 104(1).

As time progresses, the user 104(1) generates transaction 130(2) which is a download of a music player module or application to the user device 102(1). At least partly in response to this transaction, the language model module 226 adds language model elements 404(2) associated with this transaction; for example, words associated with control of the music player, such as "play." The language model elements 404(2) may also include track names, album titles, artist names, and so forth for music available to the user 104(1) for playback, such as music that has been previously purchased. These language model elements 404(2) are incorporated into the language model 132 along with those previously added language model elements 404(1).

In some implementations, the probability 416, weights, and so forth of the language model elements 404 in the language model 132 may be based at least partly on the time since they have been added to the language model 132, context in which they are added, frequency of use, and so forth. For example, the language model elements 404(2) added recently may be assigned a greater weight than the language model elements 404(1) added previously.

The user 104(1) continues to interact with the server 128, generating transaction 130(3) in which a laptop computer is purchased from a merchant. Again, language model elements 404(3) associated with the laptop computer are added by the language model module 226. These language model elements 404(3) may include words describing accessories or services associated with laptops; for example, "battery," "backup service," "mouse," and so forth.

Transaction 130(4) involves the user 104(1) buying a tablet computer as a gift for user 104(2). As part of this transaction, the user 104(1) identifies user 104(2) as the recipient, such as by specifying a delivery address, providing an emailed gift card, and so forth. As above, language model elements 404(4) associated with the tablet computer are added. The language model elements 404(4) may be selected based at least in part on the user information 218 of both the user engaging in the transaction 130, such as user 104(1), or of a recipient user 104(2). In this case, the user information 218 may designate the user 104(2) as a college student. Thus the language model elements 404(4) may be appropriate to goods or services purchased by college students, such as "textbook," "calculator," and so forth.

At least partly in response to this information, the language model elements 404(4) may be added to the language model 132(1) which is associated with the user 104(1), to another language model 132(2) associated with the recipient user 104(2), or both. As a result, both the purchasing user 104(1) may be facilitated in purchasing additional goods or services as part of the gift, as well as the recipient user 104(2) who may choose to order accessories or applications for use with the gifted tablet computer. For example, the user 104(1) may choose at a later time to shop for another gift for the user 104(2) which produces transaction 130(5). The language model 132 comprises the language model elements 404(4) for goods or services, so when the user 104(1) provides speech to the speech recognition module 120 instructing a search for "tablet covers," the recognized text will be interpreted as "tablet covers" and not "tableau converse." As a result, user experience is improved.

In one implementation, instead of or in addition to updating the recipient user's 104(2) language model 132, a language model 132(2) may be generated or provided to a device associated with the transaction 130(4). For example, the tablet computer as delivered to the user 104(2) may be configured with the language model 132(2).

Continuing the example, transaction 130(6) has the user 104(1) shopping for laptop accessories. As described above, speech input by the user 104(1) to purchase additional laptop accessories such as a "lap desk" will be recognized using the model language elements 404(3) which were previously added to the language model 132.

Figure 7:
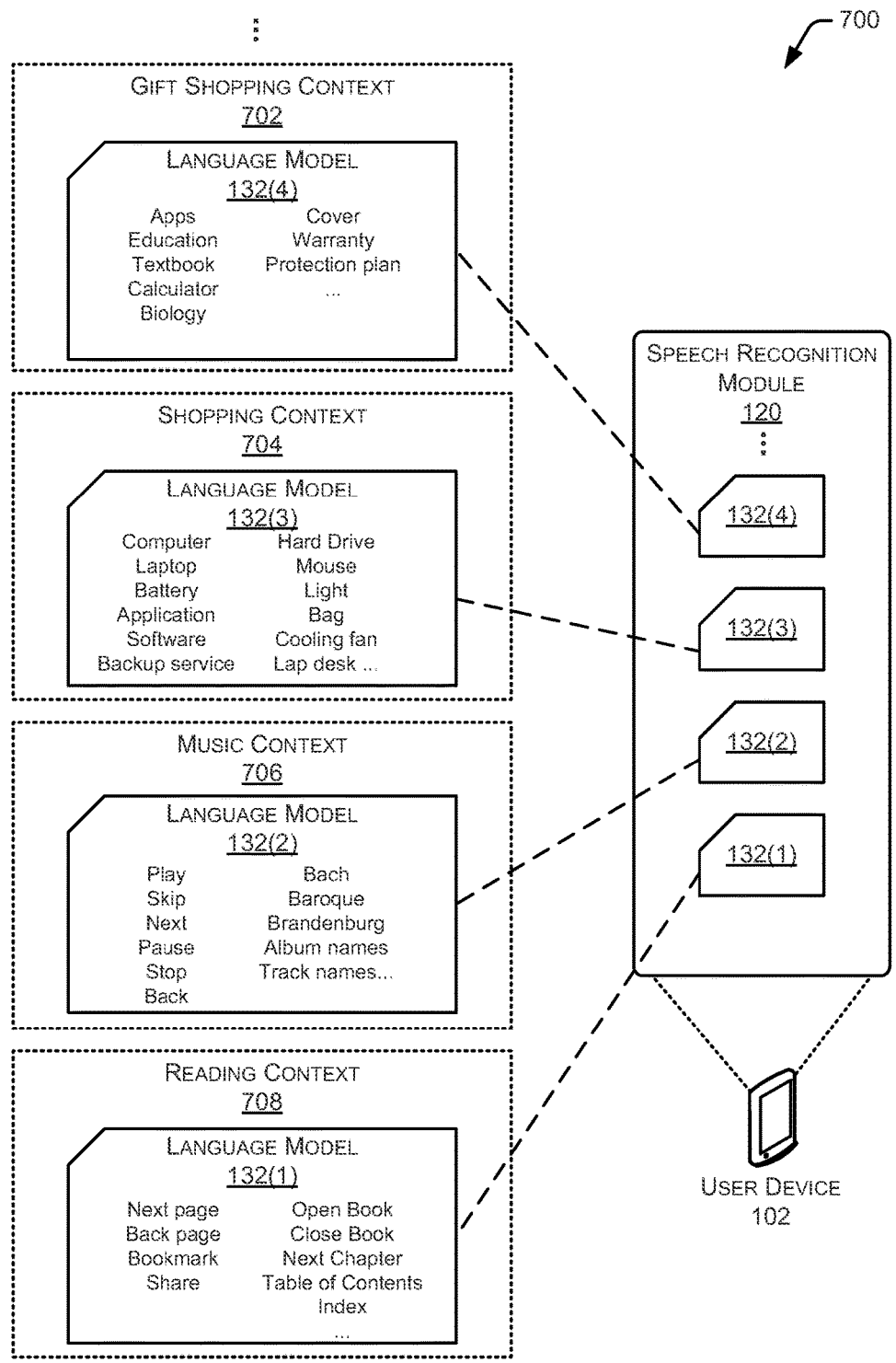
FIG. 7 illustrates several language models associated with different contexts in accordance with an embodiment of the disclosure.

FIG. 7 illustrates several language models 700 associated with different contexts. In some implementations, particular language models 132, or subsets of a single language model 132, may be activated based at least in part on a context. The context may be determined based on a type of transaction, the device involved, an activity, the execution of a particular application or module, and so forth. The context may be determined by the speech recognition module 120, and one or more language models 132 selected.

In this illustration, four language models 132(1)-(4) are depicted, associated with the transactions 130(1)-(4) described above with regard to FIG. 6. These language models have been associated with particular contexts 702-708. These contexts are provided for illustration, and not as limitations. For example, the language model 132(4) relating to the purchase of the tablet computer for the user 104(2) is associated with a gift shopping context 702. While shopping for gifts, this language model 132 may be activated. This context may be determined based on selection of particular goods or services, selection of a recipient, selection of a delivery address, based at least in part upon a date (such as for an anniversary), and so forth.

The language model 132(3) is associated with a shopping context 704 so that this language model 132(3) is available or more heavily weighted during shopping by the user 104. The language model 132(2) is associated with a music context 706. For example, activation of a music player module may be used to designate a music context 706, which would result in the language model 132(2) being activated.

The language model 132(1) is associated with a reading context 708. For example, activation of an e-book reader module may be used to designate a reading context 708, which would result in the language model 132(1) being activated. Language models 132 may be associated with one or more contexts. For example, the language models 132(4) and 132(3) may both be associated with the gift shopping context 702. The association of a language model 132 with a context may be static or dynamically changed.

In some implementations, the language models 132 may have the probability or weighting for terms modified therein based at least in part on the context. For example, while shopping for gifts, all of the language models 132(1)-(4) may be available, but the terms in the language model 132(4) associated with the gift shopping context may be assigned a higher probability of occurrence.

Illustrative Process

Figure 8:
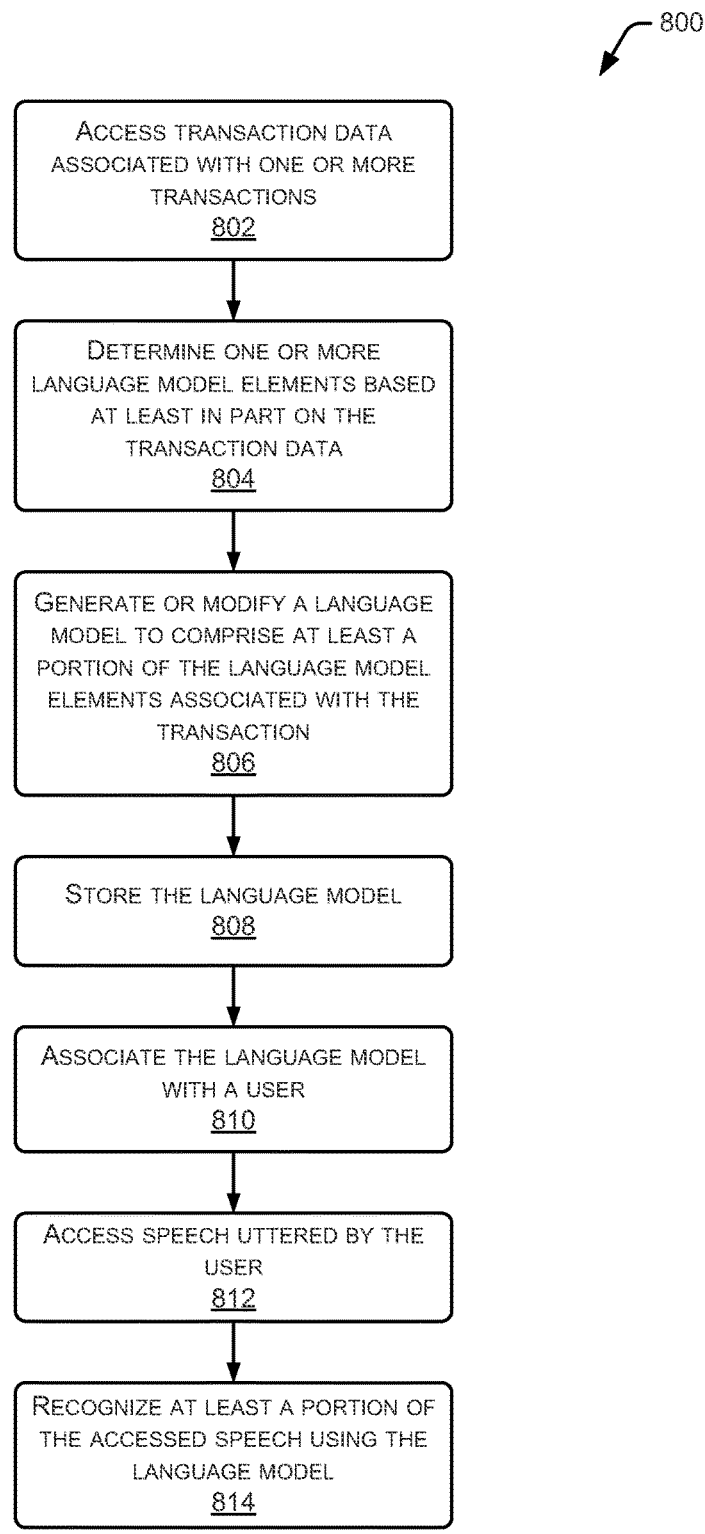
FIG. 8 illustrates a flow diagram of a process of generating a language model in accordance with an embodiment of the disclosure.

FIG. 8 illustrates a flow diagram 800 of a process of generating a language model 132. In some implementations, this process may be performed at least in part by the language model module 226, the speech recognition module 120, or a combination thereof.

Block 802 accesses transaction data 222 associated with one or more transactions. In one implementation, the transactions 130 may be between a user 104 and a merchant operating the server 128. The transaction 130 may thus comprise a purchase of a good or service from the merchant. For example, the transaction data 222 may describe the transaction 130(3) where the user 104(1) purchases a laptop computer using an online interface such as a website from the merchant.

Block 804 determines one or more language model elements 404 based at least in part on the transaction data 222. The language model elements 404 may comprise one or more words 410, phrases 412, or phonemes 406 associated with a good or service. For example, the recommendation module 224 may provide language model elements 404 such as words 410 and phrases 412 such as "lap desk" which describe goods or services related to the purchase of the laptop.

Block 806 generates or modifies a language model 132 to comprise at least a portion of the language model elements 404 associated with the transaction 130. The language model 132 may be based at least in part on a probability distribution of the language model elements 404. For example, the language model 132 may include a probability of occurrence in human speech of each of the language model elements 404. Continuing the example, as described above with regard to FIG. 6 the words "battery," "lap desk," and so forth may be added to the language model 132. This language model 132 may associate a probability 416 with language model elements 404, such as a probability of the phrase "lap desk" occurring. As described above, data about the context may be used to vary the probabilities 416 of the language model elements 404, or of which language model 132 or subset thereof to use. For example, "lap desk" and "battery" may be assigned a higher probability of occurring due to their presence in a recent transaction 130.

Block 808 stores the language model 132 in memory. For example, where the language model module 226 is processing on the server 128, the language model 132 or a portion thereof may be stored in the memory 204. In one implementation, the language model 132 may be transferred via the network 126 to the user device 102. The user device 102 may store the language model 132 in the memory 108.

Block 810 associates the language model 132 with the user 104. For example, the user information 218 in the datastore 214 for the user 104(1) may be updated to include a reference to the language model 132(1). The language model 132 may be associated with a particular user 104, or a group of users 104. For example, the language model 132 may be associated with a group of users 104 having similar demographics such as age, occupation, place of residence, and so forth.

Block 812 accesses speech uttered by the user 104. For example, the user 104(1) may say "order lap desk" into the microphone of the user device 102(1). This speech, or a representation of the audio thereof, may be transferred from the user device 102(1) via the network 126 to the server 128 and stored in the memory 204 for access by the speech recognition module 120.

Block 814 recognizes at least a portion of the accessed speech using the language model. For example, the speech recognition module 120 may access the audio received from the user device 102 and stored in the memory 204. The speech recognition module 120 is also provided with the language model during speech recognition of speech from the user 104. Thus, the audio is processed by the speech recognition module 120 using the language model 132(1) associated with the user 104(1).

Figure 9:
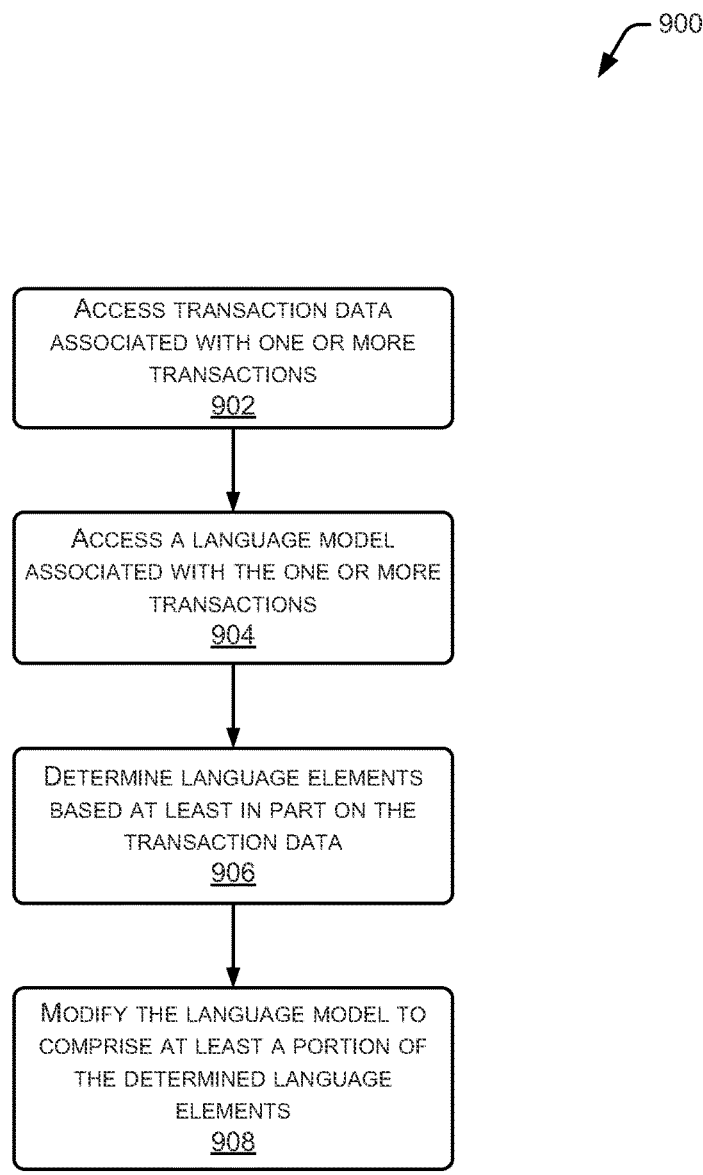
FIG. 9 illustrates a flow diagram of a process of modifying a language model in accordance with an embodiment of the disclosure.

FIG. 9 illustrates a flow diagram 900 of a process of modifying the language model 132. In some implementations, an existing language model 132 may be modified by adding, removing, or changing the language model elements 404 therein. This process may be performed at least in part by the language model module 226.

Block 902 accesses transaction data 222 associated with one or more transactions 130. As described above, the transactions 130 may comprise a purchase of a good or service from a merchant; for example, the transaction 130(4) described above where the user 104(1) purchases a tablet computer for the user 104(2) or other goods or services from an online merchant.

Block 904 accesses a language model 132 associated with the one or more transactions 130. In some implementations, the association with the language model 132 may be based at least in part on context, such as described above with regard to FIG. 7.

In some implementations, the accessed language model 132 may be associated with a particular user 104 or group of users 104. For example, when the user 104(1) logs into the server 128, that login may be related to a particular language model 132.

Block 906 determines one or more language model elements 404 based at least in part on the transaction data 222. For example, the recommendation module 224 may provide language model elements 404, such as words 410 and phrases 412 such as "protection plan," which are associated with the tablet computer purchase.

Block 908 modifies the language model 132 to comprise at least a portion of the language model elements 404 associated with the transaction. For example, the language model 132 may be amended to include the phrase 412 "protection plan." In some implementations, the modification of the language model 132 may comprise one or more of: addition of one or more language model elements 404, removal of one or more language model elements 404, or alteration of the probability weighting of one or more language model elements 404.

Figure 10:
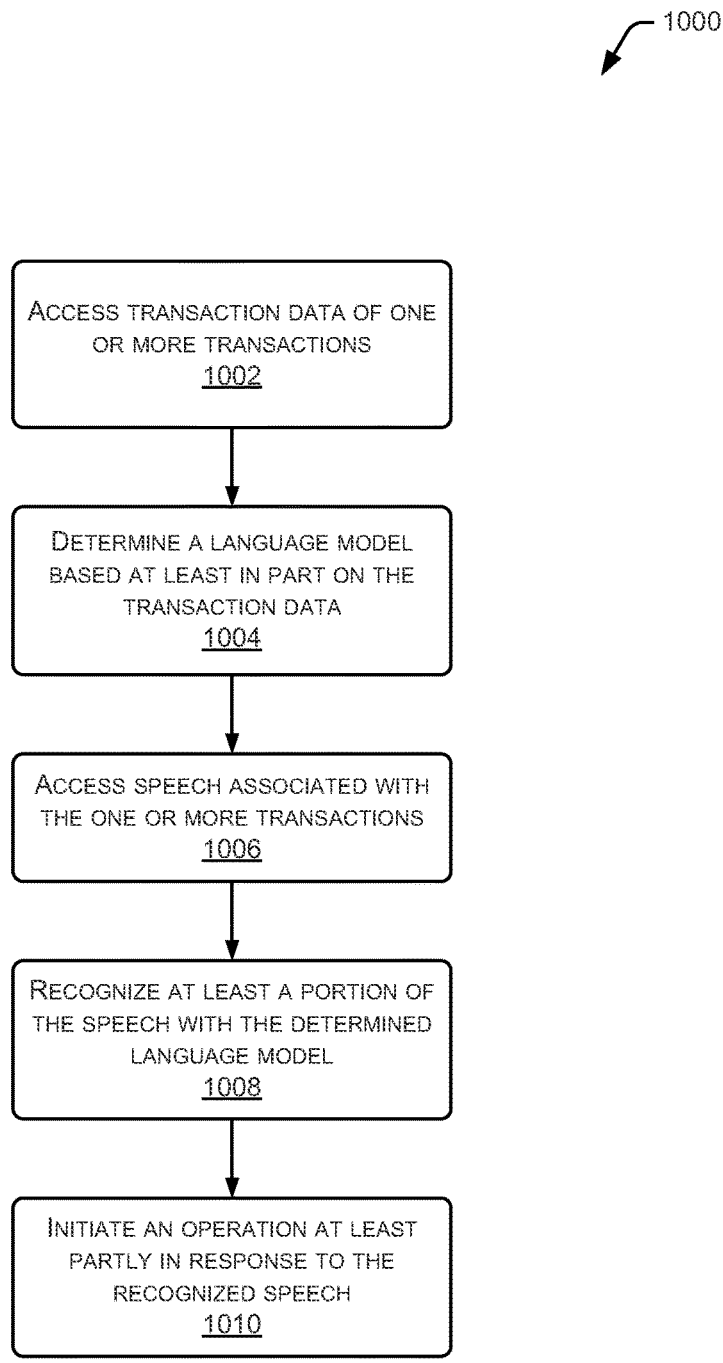
FIG. 10 illustrates a flow diagram of recognizing speech using a language model based at least in part on a transaction in accordance with an embodiment of the disclosure.

FIG. 10 illustrates a flow diagram of recognizing speech using a language model based at least in part on a transaction. This process may be performed at least in part by the speech recognition module 120 executing on one or more of the user devices 102, the server 128, or another device.

Block 1002 accesses transaction data 222 of one or more transactions 130. The access may comprise retrieving, loading, receiving, and so forth. In one implementation, the one or more transactions 130 may comprise purchases from an online merchant. The one or more transactions may involve a plurality of users. For example, transaction data 222 may be gathered from users 104(2)-(100) which have one or more demographic characteristics in common with the user 104(1), such as similar age, purchase history, place of residence, and so forth.

Block 1004 determines a language model 132 based at least in part on the transaction data 222. In one implementation, a user may be identified, and the determination of the language model 132 may comprise selection of the language model 132 previously associated with the user 104. The user may be identified using voice or speech recognition, using logon credentials, and so forth. The language model 132 may be selected based on the identity of the user, a context, a good or service selected, or a combination thereof. As described above, the language model 132 may comprise a plurality of language model elements 404, such as words or phrases. These words or phrases or other language model elements 404 may be based on one or more previous transactions.

Block 1006 accesses speech associated with the one or more transactions 130. This speech may be received by a microphone of the user device 102, or retrieved from memory. For example, a stream of audio generated by the microphone may be retrieved by the speech recognition module 120 from the memory.

Block 1008 recognizes at least a portion of the speech with the determined language model 132. Because the language model 132 contains selected language model elements 404, the language model 132 may require less space and provide faster processing than a non-selected language model 132. This determined language model 132 may provide improved accuracy compared to non-selected language models 132. For example, the user speaking "Play Brandenburg Concerto" would be interpreted correctly using the language model 132(2), compared to a non-transaction-based language model which may interpret the phrase as "Play Branden Berg Con Share Toe."

Block 1010 initiates an operation at least partly in response to the recognized speech. For example, the recognition of the phrase "Play Brandenburg Concerto" may be used to initiate the operation of playing the music track titled "Brandenburg Concerto." The operation may include initiating, completing, or otherwise participating in a transaction 130. For example, the operation may comprise the addition of a good or service to a shopping cart or an order with an online merchant, speech recognition, generation of a transcript of speech, and so forth.

Figure 11:
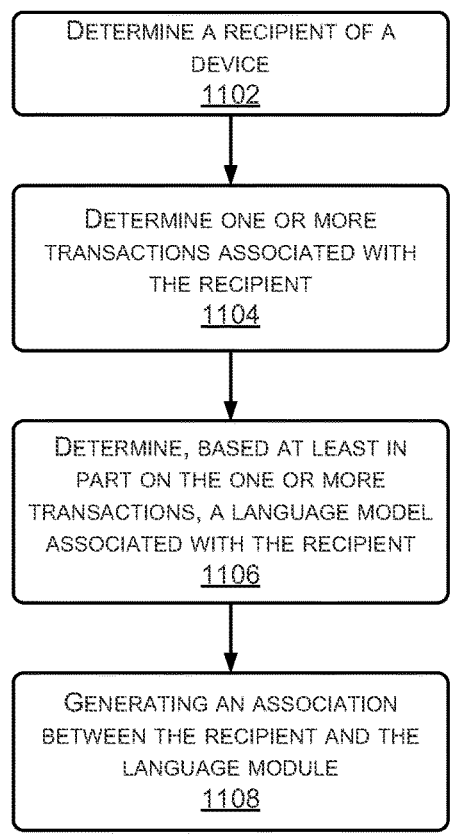
FIG. 11 illustrates a flow diagram of recognizing speech using a language model based at least in part on a transaction in accordance with an embodiment of the disclosure.

FIG. 11 illustrates a flow diagram 1100 of recognizing speech using a language model based at least in part on a transaction 130. This process may be performed at least in part by the speech recognition module 120 executing on one or more of the user device a 102, the server 128, or another device.

Block 1102 determines a recipient of a device. This recipient may be a user 104 or a group of users 104. In some implementations, the determination of the recipient may comprise retrieval of delivery data associated with the device. For example, the recipient may be identified as the user 104(2) based on the name and street address of the delivery data provided by the user 104(1) while purchasing the gift as described above in transaction 130(4) of FIG. 6. The recipient may comprise a group of users 104, such as when a device is provided to an organization such as a school or hospital in which many individuals may share the device.

Block 1104 determines one or more transactions 130 associated with the recipient. The one or more transactions may comprise one or more of a search data, a purchase, an information request, a location, and so forth. For example, the recipient user 104(2) may be determined based on the user 104(1) entering delivery or shipment information, such as the name and address of the recipient user 104(2). The one or more transactions 130 have associated transaction data 222.

Block 1106 determines, based at least in part on the one or more transactions 130, a language model 132 associated with the recipient. For example, the user 104(2) may have a history of several purchase transactions 130 for college textbooks. Based at least in part on this history, the language model module 226 may select a language model 132 containing language model elements 404 commonly used by college students.

Block 1108 generates an association between the recipient and the language model. This association may include a reference in the datastore 214, such that speech from the user 102(1) when recognized will be processed by the speech recognition module 120 using the language module 132(1).

The association, or at least a portion of the language model 132 may be provided to the user device 102 or the server 128. Continuing the example, the tablet computer may be configured to receive and accept the language model 132 such that when the recipient user 104(2) uses the device, a speech recognition module 120 thereon may use the language model 132 to recognize the speech. Or the server 128 may determine based at least in part on this association that speech originating from the recipient user 104(2) is to be recognized with the language model 132.

In another implementation, the language model 132 may be provided to another server 128 with which a device is configured to communicate with. The recipient user 104(2) may be associated with a particular account or service or otherwise identified. For example, the device may comprise a robot which communicates to a server which is configured to provide speech recognition for command inputs. The language model 132 provided may include the language model elements 404 for goods previously purchased by the user 104(2) such that when the user speaks the command "bring lap desk," the spoken command is readily recognized.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
    at least one memory storing computer-executable instructions; and
    at least one processor configured to access the at least one memory and execute the computer-executable instructions to:
        determine an item associated with a transaction between a merchant and a user device using non-speech based user input transaction data associated with the transaction;
        determine a context associated with the transaction using at least a portion of the transaction data, the context comprising a set of one or more language model elements;
        determine, using the context, a first language model element of the set of one or more language model elements having a predefined association with the item, wherein the first language model element represents a command word or phrase;
        modify a language model by including the first language model element in the language model, resulting in a modified language model;
        determine, using the modified language model, that speech received by a user device includes the command word or phrase; and
        cause an operation corresponding to the command word or phrase to be initiated in connection with the item.

2. The system of claim 1, the transaction comprising a purchase of a good or service from the merchant.

3. The system of claim 1, wherein the set of one or more language model elements comprises one or more words, phrases, or phonemes associated with a good or service.

4. The system of claim 1, wherein the language model is based at least in part on a respective probability of occurrence in speech of each of the set of one or more language model elements.

5. The system of claim 1, wherein the item comprises consumable content, and wherein the at least one processor is configured to initiate the operation to enable, at least in part, consumption of the consumable content.

6. The system of claim 1, wherein the transaction is non-speech based.

7. The system of claim 1, wherein the at least one processor is further configured to execute the computer-executable instructions to determine a category for the item, and wherein the at least one processor is configured to determine at least one language model element based at least in part on a predefined association with the category for the item.

8. The system of claim 1, wherein the language model comprises a second language model element, and wherein the at least one processor is further configured to execute the computer-executable instructions to:
    determine that the second language model element was added to the language model prior to the first language model element;
    determine a first weight assigned to the second language model element;
    determine a second weight that is greater than the first weight; and
    assign the second weight to the first language model element.

9. The system of claim 1, wherein to determine the context, the at least one processor is further configured to access acquisition data indicative of selection of a good for purchase; and
    identify the context based at least on the selection of the good for purchase.

10. The system of claim 1, wherein to determine the context, the at least one processor is further configured to access location data indicative of selection of a delivery address; and
    identify the context based at least on the selection of the delivery address.

11. A system, comprising:
    at least one memory storing computer-executable instructions; and
    at least one processor configured to access the at least one memory and execute the computer-executable instructions to:
        determine a first item associated with a purchase transaction between a merchant and a user device using transaction data associated with the purchase transaction, the purchase transaction comprising a purchase of a good or a service from the merchant;
        generate a purchase recommendation for a second item using at least a portion of the transaction data, wherein the second item is associated with the first item;
        send the purchase recommendation to the user device;
        determine one or more language model elements having a predefined association with the first item, the one or more language model elements comprising at least one language model element representative of the second item associated with the first item; and
        modify a language model by including the at least one language model element in the language model.

12. The system of claim 11, wherein the at least one processor is further configured to modify the language model by executing the computer-executable instructions to remove a particular language model element from the language model or alter a probability of occurrence in human speech of the particular language model element.

13. The system of claim 11, wherein the language model is associated with the user or a group of users.

14. The system of claim 11, wherein to generate the purchase recommendation, the at least one processor is further configured to determine an association between third items and the item; and
    select the second item from the third items.

15. One or more non-transitory computer-readable media storing computer-executable instructions that, when executed by at least one processor, configure the at least one processor to perform operations comprising:

determining an item associated with a transaction between a merchant and a user device using non-speech based user input transaction data associated with the transaction;

determining a context associated with the transaction using at least a portion of the transaction data, the context comprising a set of one or more language model elements;

determining, using the context, a first language model element of the set of one or more language model elements having a predetermined association with the item, wherein the first language model element represents a command word or phrase;

modifying a language model by including the first language model element in the language model, resulting in a modified language model;

recognizing, using the modified language model, presence of the command word or phrase in input speech data; and causing an operation corresponding to the command word or phrase to be initiated in connection with the item.

16. The computer-readable media of claim 15, the transaction comprising a purchase of the item from an online merchant.

17. The computer-readable media of claim 15, the operations further comprising:

identifying the user; and selecting the language model from one or more candidate language models associated with the user.

18. The computer-readable media of claim 15, the operations further comprising adding a good or service to an order with the merchant.

19. The computer-readable media of claim 15, the language model comprising a plurality of language model elements.

20. The computer-readable media of claim 19, the plurality of language model elements based on one or more previous transactions.

21. One or more non-transitory computer-readable media storing computer-executable instructions that, when executed by at least one processor, configure the at least one processor to perform operations comprising:

determining an item associated with a transaction linked to a first user account;

determining a second user account associated with a recipient of the item;

determining a language model, wherein the language model comprises one or more language model elements having a predetermined association with the item associated with the transaction; and associating the language model with the second user account, wherein operations of the item can be initiated with speech input corresponding to at least one of the one or more language model elements.

22. The computer-readable media of claim 21, wherein determining the second user account comprises determining that the second user account is associated with a delivery address specified in connection with the transaction.

23. The computer-readable media of claim 21, the transaction comprising one or more of a search, a purchase, an information request, or a location.

24. The computer-readable media of claim 21, wherein the item is a device, the operations further comprising providing at least a portion of the language model to the device for use in recognizing speech.

* * * * *